United States Patent Office 3,700,647
Patented Oct. 24, 1972

3,700,647
ALTERNATING COPOLYMERS OF ALPHA-OLEFINS AND ACRYLIC COMPOUNDS
Kohei Nakaguchi, Shohachi Kawasumi, Masaaki Hirooka, and Hiroshi Yabuuchi, Niihama, Japan, assignors to Sumitomo Chemical Company, Ltd., Osaka, Japan
No Drawing. Original application Jan. 27, 1965, Ser. No. 428,531. Divided and this application Feb. 16, 1971, Ser. No. 115,874
Claims priority, application Japan, Jan. 30, 1964, 39/4,401
Int. Cl. C08f *19/10, 15/18*
U.S. Cl. 260—63 R      41 Claims

ABSTRACT OF THE DISCLOSURE

Novel alternating copolymers of terminally unsaturated hydrocarbons of the formula

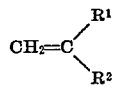

wherein $R^1$ and $R^2$ each is hydrogen or an alkyl, aryl aralkyl, alkylaryl or cycloalkyl radical and an acrylic compound of the formula

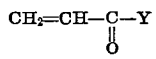

wherein Y is R, SR, ZH, ZMe, NR'R", halogen or hydrogen in which Z is oxygen or sulfur, R is a hydrocarbon or halohydrocarbon radical, R' and R" each is hydrogen or a hydrocarbon radical, Me is a metal or ammonium radical and their method of production comprising contacting the aforementioned monomers with an organo-aluminum halide of the formula $AlR'''_nX_{3-n}$ wherein R''' is a hydrocarbon radical, X is a halogen and $n$ is 1, 1.5 or 2, said alternating copolymers being useful as molded products, films, fibers, calking compounds, coating materials, adhesives and the like.

---

This application is a division of our copending application Serial No. 428,531, filed Jan. 27, 1965, now U.S. Pat. 3,647,771.

This invention relates to novel alternating copolymers of alpha-olefins and vinyl compounds and a process for manufacturing the same. More particularly it relates to novel alternating copolymers of terminally unsaturated hydrocarbons having 2 to 20 carbon atoms or derivatives thereof and vinyl compounds having carbonyl or thiocarbonyl radical at conjugate position and a process for manufacturing the same according to a novel "complex polymerization mechanism."

The copolymerization reaction does not always proceed with an arbitrary combination of monomers. This is particularly true in the ionic polymerization. Vinyl compounds having electrophilic radicals such as carbonyl or thiocarbonyl radicals at conjugate position (they will be abbreviated hereinafter as acrylic monomers) polymerize well, in general, in the presence of anionic polymerization catalysts but they do not generally produce polymers in the presence of cationic catalysts. On the other hand alpha-olefins polymerize well in the presence of cationic catalysts but they do not polymerize with anionic catalysts except some specified compounds such as styrene or the like. Co-ordination catalysts such as Ziegler type catalysts can make alpha-olefins polymerize well but they do not make, in general, acrylic monomers polymerize because of their strong interaction with the latter. Furthermore when acrylic monomers are present, the polymerization of olefins is prevented and copolymers of acrylic monomers and olefins cannot in general be produced. Various organo-metallic compounds such as butyllithium or Grignard reagent, make acrylic monomers polymerize well but they are inactive to olefins. Radical polymerization catalytic system is the most appropriate to obtain valuable copolymers. However since some olefinic hydrocarbons such as propylene, isobutylene or the like are apt to cause degradative chain transfer reaction and lack in radially polymerizable property, copolymers of such hydrocarbons and acrylic monomers have not been heretofore known. It is well known that styrene and ethylene produce copolymers with acrylic monomers but most of other olefins are generally poor in copolymerizability.

As apparent from the foregoing description the production of copolymers of alpha-olefins and acrylic monomers by prior art is rather difficult. These are concerned with the random copolymers whereas alternating polymers can be produced by only further specific combination of monomers. The cases in which the formation of alternating copolymer has been known are only those special combination of monomers in which one member has extraordinarily large polarity, i.e., according to Price-Alfrey's Q-e Scheme indicating reactivity of monomer, such as maleic anhydride, maleiimde, fumaryl chloride, or vinylidene cyanide which has an extraordinarily large e-value, and another member is a comonomer such as alpha-methylstyrene, styrene or the like which is an alpha-olefin having a negative e-value. Since the former monomers have large polarity, they have no ability for radical homopolymerization. It is believed that they only react with comonomer having opposite polarity and on this account they produce alternating copolymers. On the other hand it has been extremely difficult to obtain alternating copolymer from the combination of monomers having random copolymerizability. Such alternating copolymers have not been known.

Accordingly it has been never expected that the copolymerization occurs with extremely large reactivity between acrylic monomers and alpha-olefins thereby to produce selectively alternating copolymers. This is really surprising fact. In other words the polymerization method of producing copolymers of this kind is entirely novel and resulting alternating copolymers all belong to novel compounds because by conventional polymerization methods such combinations of monomers, have not provided copolymers at all or have provided only random copolymers.

An object of the present invention is to provide novel alternating copolymers of an alphaolefin selected from the group consisting of terminally unsaturated hydrocarbons having 2 to 20 carbon atoms and derivatives thereof and a vinyl compound having carbonyl or thiocarbonyl radical at the conjugate position and represented by the general formula of

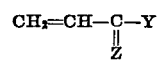

wherein Z is a member selected from the group consisting of oxygen and sulfur atoms, Y is a member selected from the group consisting of ZR, ZH, ZMe,

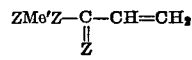

NR'R", hydrogen and halogen atoms and R, in which R is a member selected from the group consisting of hydrocarbon radicals having 1 to 20 carbon atoms and derivatives thereof, R' and R" are same or different members selected from the group consisting of hydrogen atom, hydrocarbon radicals and derivatives thereof including the case when R' and R" are united at the position other than N, and Me is a member selected from the group consisting of metals belonging to the first group of the Mendeleev's periodic table and ammonium radical, and Me' is a member selected from the group consisting of metals belonging to the second group of the Mendeleev's periodic table. Another object of the present invention is to provide a method for producing the above-mentioned alternating copolymers.

Other objects of the present invention will become apparent to those skilled in the art by referring to the description hereinafter.

These objects can be attained by contacting above-mentioned alpha-olefin and vinyl compound with organoaluminum halide having an average composition as represented by the general formula of $AlR'''_nX_{3-n}$, wherein R''' is hydrocarbon radicals having 1 to 20 carbon atoms, X is a halogen atom, $n$ is an arbitrary number satisfying the relation $0<n<3$.

It is known that organoaluminum halide having the general formula of $AlR'''_nX_{3-n}$, e.g., diethylaluminum chloride or ethylaluminum dichloride, is a kind of Lewis acid as aluminum trichloride and useful as a cationic catalyst by itself. For example, it has been reported that propylene produces liquid low molecular weight polymer with ethylaluminum dichloride catalyst and styrene produces solid but low molecular weight polymer with the same catalyst. Thus alpha-olefins, in general, produce, by cationic polymerization, low polymer relatively poor in the practical value. On the other hand, in the case of acrylic monomers, no substantial polymerization activity is, in general, observed except that strong co-ordination occurs at the position of the carbonyl radical of acrylic monomer. As for trialkyl aluminum it has been known that ethylene causes the reaction which makes alkyl radical grow but the polymerization activity of alpha-olefins, in general, is not observed. From the results it is entirely beyond expectation that organoaluminum halides having the general formula of $AlR'''_nX_{3-n}$ give alternating copolymers of an alpha-olefin and an acrylic monomer with extremely high reaction rate.

Organoaluminum halides useful in the present invention are different from simple polymerization catalysts conventionally known. It is believed that the organoaluminum halides of the present invention play the role not only for generating labile species to initiate polymerization, but also for forming complexes with acrylic monomers. This fact can be predicted from the favorable result of polymerization obtained when approximately equimolecular amounts of organoaluminum halides and acrylic monomers are used, furthermore the formation of complexes of this kind can be confirmed by the shift of carbonyl radical in the infrared absorption spectra.

It has been known that metallic salts have promoting function to radical polymerization. Apart from such function as a co-catalyst, attempts have been made to alter the reactivity of monomer by co-ordination to form complexes. Kargin et al., Vysokomol. Soed. 2 765 (1960), tried to obtain sterospecific polymers by the radical polymerization of methyl methacrylate-zinc complex. Further, Imoto et al., Makromol. Chem. 65 174, 180 and 194 (1963), found that the polymerization of acrylonitrile, or methyl methacrylate with radical initiators is promoted when zinc chloride is co-ordinated to these monomers, and they ascribed these results to the change of reactivity of the monomers by the co-ordination. In these cases, the products obtained are random copolymers. On the other hand, the copolymers of the present invention are alternating ones. The present process is essentially different from prior art polymerization not only in the point that it provides selectively alternating copolymers but also in the point that it does not require the addition of component corresponding to radical polymerization catalyst. As apparent from the above-mentioned characteristic properties the present process is quite unique compared with prior art polymerization processes. Since the present process is considered to be a novel polymerization mode, this kind of polymerization will be referred to as "complex polymerization" hereinafter.

The alternating copolymers according to the present invention are in general high molecular weight, white solid materials. The intrinsic viscosity measured from their solution are variable in the range of 0.1 to 10. The fact that such high molecular weight polymers are produced, clearly indicates that the present process is different from the conventional cationic polymerization, by which only low molecular weight polymers of olefins are obtained with organoaluminum halide. Further the alternating copolymers of the present invention are superior to and in striking contrast to prior art alternating copolymers which are obtained by radical polymerization and have in general low molecular weight.

The copolymers obtained by the present invention are, as they are, amorphous and do not have clear melting points. This is observed from the result of differential thermal analysis. These solid copolymers are of high molecular weight and at the same time they are thermally more stable than acrylic homopolymers. It is their characteristic property that they hardly decompose at higher temperatures. For example, a homopolymer of methyl acrylate decomposes at 350° C. in the atmosphere of nitrogen, but an alternating copolymer of the same material with propylene decomposes appreciably only at 410° C. The solubilities of copolymers obtained by the present invention in various solvents are considerably different from those of corresponding homopolymers. For example, polymethyl acrylate is insoluble in ether but alternating copolymer of methyl acrylate with propylene is soluble in ether.

As above-mentioned the copolymers of the present invention have various superior characteristic properties. They can find their application in various uses where these characteristic properties are most effectively utilized. Besides this, such characteristics as failed to be attained with individual homopolymers are frequently attained by the copolymerization. Besides the use of copolymers by itself, it is possible to modify the properties of the copolymers by blending with other polymers or by the reaction of polymers. For example, a homopolymer having insufficient compatibility with another polymer can be made into a homogeneous polyblend by changing into a copolymer. It is also possible to convert the copolymers into substances having three dimensional structure by use of a cross-linking agent.

The copolymers obtained by the present invention have a wide variety of use, i.e., molded products, films, fibers calking compounds, coating materials, adhesives and the like.

Alpha-olefins useful in the practice of the present invention are terminally unsaturated hydrocarbons having 2 to 20 carbon atoms or derivatives thereof. They are vinyl or vinylidenes type compounds represented by the general formula of $CH_2=CH-R^1$ or

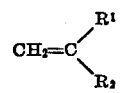

wherein $R^1$ and $R^2$ each is a member selected from the group consisting of alkyl, aryl, aralkyl, alkylaryl and cycloalkyl radicals. They include, in general, compounds having good polymerizable property with a cationic type catalyst. Examples of such olefins are ethylene, propylene, butene-1, isobutene, pentene-1, hexene-1, heptene-1, 3-methylbutene-1, 2-methylpentene-1, 4-methylpentene-1, 4-methylhexene-1, decene-1, dodecene-1, octadecene-1, 4-phenylbutene-1, styrene, alpha-methylstyrene, alpha-butylstyrene, p-dimethylaminostyrene, p-methoxystyrene, p-methylstyrene, m-methylstyrene, allylbenzene, isopropenylbenzene, vinylnaphthalene, and vinylcyclohexane.

The compounds used in the present invention as comonomers of above-mentioned alpha-olefins are vinyl compounds having the general formula of

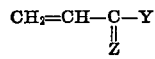

wherein Z is a member selected from the group consisting of oxygen and sulfur atoms, Y is a member selected from the group consisting of ZR, ZH,

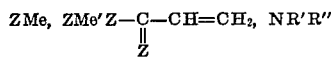

hydrogen and halogen atoms and R, in which R is a member selected from the group consisting of hydrocarbon radicals having 1 to 20 carbon atoms and derivatives thereof, R' and R" each is a member selected from the group consisting of hydrogen atom, hydrocarbon radicals having 1 to 20 carbon atoms and derivatives thereof including the case when R' and R" are mutually united at the part other than N and also the case when R' and R" are the same and Me is a member selected from the group consisting of metals belonging to the first group of the Mendeleev's periodic table and ammonium radical and Me' is a member selected from the group consisting of metals belonging to the second group of the Mendeleev's periodic table. They include esters of acrylic acid, esters, of thioacrylic acid, esters of thionacrylic acid, esters of dithioacrylic acid, acrylamide, thioacrylamide, N-substituted acrylamide, N-substituted thiacrylamide, N,N-disubstituted acrylamide, N,N-disubstituted thioacrylamide, acrylic acid halide, thioacrylic acid halide, acrylic acid, thioacrylic acid, thionacrylic acid, dithioacrylic acid, salts of these acids, acrolein, vinyl ketone compounds and the like. R, R' and R" in these compounds are hydrocarbon radicals having 1 to 20 carbon atoms and derivatives thereof and include alkyl, aryl, aralkyl, alkylaryl, cycloalkyl radicals and the like. As Me, Li, Na, K, Rb, Cu, Ag, Be, Ca, Sr, Ba, Mg, Zn, Cd, Hg, $NH_4$ and the like are illustrated. Representative derivatives of acrylic monomers include methyl acrylate, ethyl acrylate, isopropyl acrylate, n-butyl acrylate, t-butyl acrylate, n-amyl acrylate, n-octyl acrylate, n-dodecyl acrylate, tetradecyl acrylate, octadecyl acrylate, vinyl acrylate, allyl acrylate, phenyl acrylate, o-tolyl acrylate, benzyl acrylate, cyclohexyl acrylate, cyclopentyl acrylate, 2-chloroethyl acrylate, beta-chlorallyl acrylate, dimethylaminoethyl acrylate, 2-ethoxyethyl acrylate, 2-nitropropyl acrylate, methyl thiolacrylate, ethyl thiolacrylate, isopropyl thiolacrylate, phenyl thiolacrylate, methyl thionacrylate, methyl dithioacrylate, acrylamide, thioacrylamide, N-methyl acrylamide, N-ethylacrylamide, N-n-butylacrylamide, N-n-hexyl acrylamide, N-n-octyl acrylamide, N-2-ethylhexyl acrylamide, N-n-dodecyl acrylamide, N-stearyl acrylamide, N-cyclohexyl acrylamide, N-tolylacrylamide, N-methyl thioacrylamide, N,N-dimethyl acrylamide, N,N-di-n-butyl acrylamide, N-methyl-N-ethyl acrylamide, acrylyl morpholine, acrylyl pyrrolidine, N,N-dimethyl thioacrylamide, acryloyl chloride, acryloyl bromide, acryloyl iodide, thioacryloyl chloride, acrylic acid, thiolacrylic acid, thionacrylic acid, dithioacrylic acid, sodium acrylate, potassium acrylate, zinc acrylate, ammonium acrylate, acrolein, methyl vinyl ketone, ethyl vinyl ketone, phenyl vinyl ketone, cyclohexyl vinyl ketone, vinyl-[4-methyl-naphthyl-(1)-]ketone and the like, but they are not limited to the foregoing members.

The organoaluminum halides used in the present invention are compounds having the general formula of $AlR'''_nX_{3-n}$ wherein R''' is a member selected from the group consisting of hydrocarbon radicals having 1 to 20 carbon atoms and derivatives thereof, X is a halogen atom and $n$ is an arbitrary number which satisfies $0<n<3$. As R''', alkyl, aryl arylalkyl, alkylaryl and cycloalkyl radicals are illustrated. Representative R''' includes methyl, ethyl, propyl, butyl, hexyl, octyl, dodecyl, octadecyl, allyl, phenyl, tolyl, naphthyl, cyclohexyl, cyclopentadienyl, benzyl radicals and derivatives thereof. X includes chlorine, bromine, iodine, and fluorine atoms. The compounds of which $n$ is either 0 or 3 in the above formula, such as aluminum halide or trialkyl aluminum do not have polymerization activity in the present invention. R''' and X must always be present simultaneously, and $n$ is not necessarily an integer. A mixture of compounds having integers of $n$ is useful if the relation of $AlR'''_nX_{3-n}$ is held in the form generalized to the mixtures. Representative compounds of this kind include ethylaluminum dichloride, i-butylaluminum dichloride, hexylaluminum dichloride, dodecylaluminum dichloride, octadecylaluminum dichloride, phenylaluminum dichloride, cyclohexylaluminum dichloride, ethylaluminum dibromide, ethylaluminum diiodide, vinylaluminum dichloride, allylaluminum dichloride, ethylaluminum sesquichloride, ethylaluminum sesquibromide, ethylaluminum sesquifluoride, phenylaluminum sesquiiodide, diethylaluminum chloride, diethylaluminum fluoride, ethylphenylaluminum chloride and dicyclohexylaluminum chloride.

As for proportion of organoaluminum halide compound to monomer, any proportion may be selected. For example, it may be from 0.01 to 10 mol based upon the mol of acrylic monomer. However, what is important in the present invention is the formation of complex between acrylic monomer and organoaluminum halide. When the organoaluminum halide is used in an approximately equimolar proportion to an acrylic monomer, the copolymerization may be particularly carried out effectively and a copolymer having excellent properties may be obtained. It is, of course, possible to carry out polymerization at the condition of less than equimolar proportion. The method of admixing the organoaluminum halide with the monomers may be carried out, in general, optionally. Particularly when the reaction is carried out at a low temperature, the homopolymerization of the individual monomers will not practically occur in most of the cases. Accordingly it is possible to select any arbitrary order of addition at a low temperature to produce copolymers alone. For example, a process in which the monomers are mixed at first, then solvent if desired and finally the organoaluminum halide is added thereto—another process in which an acrylic monomer is admixed with an organoaluminum halide to produce a complex and an olefin is added thereto occasionally in gaseous form—a further process in which an olefin is mixed with an organoaluminum halide at first and an acrylic monomer is thereto added or continuously dropped—still a further process in which these operations are carried out continuously and reaction product is continuously withdrawn—it is possible to select any of these processes. However, when the polymerization is carried out at a relatively high temperature and the cationic polymerization of olefin is liable to occur or the homopolymerization of the acrylic monomer may possibly occur, it is necessary to select the order of addition and the polymerization conditions so as to obtain copolymers selectively at such conditions. It is possible to select any of adequate processes such as lowering of polymerization temperature, or if contact of organoaluminum halide with one monomer is not suitable, allowing it to contact with the other monomer or to contact with previously mixed two monomers or the like.

In all cases in the present invention, alternating copolymers are obtained. In other words, the composition of copolymer is independent upon the monomer composition. However since the rate of polymerization, molecular weight and other properties of the polymer are frequently affected by mixing ratio of olefin to acrylic monomer and adequate mixing ratio of monomers may be chosen depending upon the purpose. Generally speaking, when the olefin is used excessively to the acrylic monomer, it is possible to increase the conversion based upon the acrylic monomer. An arbitrary polymerization temperature ranging from so low as $-150°$ C. to $+100°$ C. may be selected. The polymerization system of the present invention is occasionally so active that the polymerization completes within several minutes or several ten minutes even at e.g. −78° C. Since the homopolymerization hardly occurs at such a low temperature, it is suitable to obtain pure copolymer if polymerization is caried out at such a low temperature. The polymerization at a low temperature has also such advantage that even monomers gaseous at room temperature can be subjected to the homogeneous liquid phase polymerization under atmospheric pressure. On the other hand when the condition of low temperature is hard to be attained, it is possible to obtain copolymers effectively by carrying out polymerization at room temperature or at a higher temperature than that. It is possible to carry out polymerization under a superatmospheric pressure when monomers are gaseous at room temperatures. It is, in general, necessary to carry out the polymerization in an inert atmosphere. It is suitable to carry out the polymerization in the absence of polar compounds such as water or others.

In the practice of the present invention, it is possible to carry out bulk polymerization in a liquid monomer and also to carry out polymerization in a usual inert vehicle. Such inert vehicles include common hydrocarbons and halogen-containing hydrocarbons. As typical vehicles are exemplified propane, butane, pentane, hexane, heptane, octane, ligroin, petroleum ether and other petroleum type mixed solvent, benzene, toluene, xylene, cyclohexane, methylcyclohexane, carbon tetrachloride, chloroform, methylene dichloride, ethylene dichloride, trichloroethylene, tetrachloroethylene, hexachloroethane, butyl chloride, chlorobenzene and bromobenzene. Compounds which form stable complexes with organoaluminum halide are not favorable as vehicles. Particularly such compounds as are capable to form complexes having bonds stronger than those between acrylic monomers and organoaluminum halide are utterly unsuitable. What are not favorable as vehicles, are ethers such as ethyl ether, tetrahydrofuran or the like, ketones, nitriles or the like cannot be called suitable ones.

After the completion of polymerization reaction, it is possible to subject resulting polymers to customary after-treatment for purification and recovery. As such after-treatment, those which have been used heretofore in cases of cationic polymerization using Lewis acids, and the polymerization using Ziegler-Natta's type catalysts, such as treatment with alcohol, with alcohol and hydrochloric acid, with hydrochloric acid, with alkali or the like can be arbitrarily used. It is also possible to separate and recover the organoaluminum halide from the resulting polymer by e.g. adding a compound capable of forming complex therewith without decomposing it.

Following examples are given to illustrate the present invention but it is by no means intended to be limitative of the invention.

EXAMPLE 1

A 300 ml. three-necked flask equipped with a stirrer was evacuated, flushed with nitrogen and cooled to −78° C. with Dry Ice and methanol. Sixty nine grams of liquefied propylene and 2 g. of methyl acrylate were charged in this flask under the atmosphere of nitrogen and homogeneously mixed. Further 32.5 mmol of ethylaluminum dichloride was added thereto and the polymerization was carried out at −78° C. After 2 hours methanol was added to the content to stop polymerization, and the content was withdrawn and insoluble product was collected by filtration. Resulting solid product was treated with hydrochloric acid and methanol, and washed sufficiently with methanol, thereafter, the solid product was dried in vacuo at 50° C., whereby 1.80 g. of white copolymer was obtained.

The resulting copolymer was soluble in ethyl ether and had properties different from any of the homopolymers of methyl acrylate and of propylene. The intrinsic viscosity of this copolymer measured in benzene solution at 30° C., was 3.55 dl./g.

EXAMPLES 2 TO 5

The polymerization of propylene and methyl acrylate and the after-treatment of the resulting polymers were carried out in similar way as in Example 1 except that the values of additional amounts of liquefied propylene, catalyst, and solvent, and polymerization time, were selected as indicated in the Table 1, whereby white solid copolymers were obtained.

TABLE 1

| | Monomer (grams) | | | | Polymerization | | Resulting copolymer | |
|---|---|---|---|---|---|---|---|---|
| Ex. No. | Propylene | Methyl acrylate | Vehicle (ml.) | Organoaluminum halide (mmol.) | Temperature (°C.) | Time (minutes) | Production amount (grams) | Intrinsic viscosity (dl/grams) |
| 2 | 50 | 2 | No | Ethylaluminum sesquichloride, 11.6 | −78 | 10 | 2.20 | 1.44 |
| 3 | 20 | 2 | No | Methylaluminum sesquibromide, 12.5 | −78 | 10 | 0.97 | 6.20 |
| 4 | 20 | 2 | Toluene, 50 | Ethylaluminum sesquichloride, 12.5 | −78 | 10 | 1.83 | 1.74 |
| 5 | 20 | 2 | Heptane, 50 | do | −78 | 10 | 2.08 | 1.23 |

EXAMPLE 6

Propylene and methyl acrylate were copolymerized in the presence of ethylaluminum dichloride in similar procedure as in Example 1 and the resulting copolymer was purified by reprecipitation using acetone-methanol. The intrinsic viscosity of the resulting copolymer measured in benzene solution at 30° C. was 4.95. The values of elementary analysis were C: 65.50% and H: 9.46%. These values coincide with the theoretical value of 1:1 alternating copolymer. Apart from this experiment, an alternating copolymer of propylene and methyl acrylate produced by the same procedure softened and liquefied at 118° to 122° C. by microscopic observation. However according to differential thermal analysis, it had no distinct melting point and accordingly it was considered as amorphous polymer. When this polymer was pressed at 125° C. for about 3 minutes, flexible film with good transparency was obtained. The specific gravity of this film at 23° C. was 1.069.

EXAMPLE 7

A 300 ml. three-necked flask equipped with a stirrer was evacuated, flushed with nitrogen and cooled to −78° C., with Dry Ice and methanol. Twenty grams of liquefied propylene and 50 mmol of ethylaluminum dichloride were charged and mixed in this flask under the atmosphere of nitrogen. Further 4 g. of n-butyl acrylate was added thereto and the polymerization was carried out at −78° C. for 10 minutes. After similar after-treatment as in Example 1, 1.61 g. of white solid copolymer was obtained. The values of elementary analysis of this copolymer were C: 68.99% and H: 10.42%.

EXAMPLE 8

In similar way as in Example 7, with 20 g. of propylene, 2 g. of n-octyl acrylate and 12.5 mmol of ethylaluminum sesquichloride 2.20 g. of white solid copolymer was obtained at −78° C. The intrinsic viscosity of this copolymer was 1.70 and from the result of elementary analysis, this copolymer was considered as a 1:1 alternating copolymer.

EXAMPLE 9

By using 30 g. of propylene, 2 g. of methyl thiolacrylate and 25 mmol of ethylaluminum dichloride, similar procedure as in Example 1 was carried out for 10 minutes, whereby 1.50 g. of solid copolymer was obtained.

EXAMPLE 10

By use of 20 g. of propylene, 2 g. of acryloyl chloride and 25 mmol of ethylaluminum dichloride, similar procedure as in Example 1 was carried out for 10 minutes, whereby 1.45 g. of solid copolymer was obtained.

EXAMPLE 11

By use of 20 g. of propylene, 1.5 g. of acrylic acid and 25 mmol of ethylaluminum dichloride, similar procedure as in Example 1 was carried out for 10 minutes, whereby 2.56 g. of polymer was obtained. From the result of infrared spectroscopic analysis, it was confirmed as a copolymer.

EXAMPLE 12

By use of 30 g. of propylene, 4 g. of N-ethylacrylamide and 50 mmol of ethylaluminum dichloride, similar procedure as in Example 1 was carried out for 10 minutes. A large amount of acetone was added to terminate the polymerization and solid product was collected by filtration. Afater washing sufficiently with acetone, the resulting solid product was dried in vacuo at 50° C. to yield 3.74 g. of solid polymer. From the result of infra-red spectroscopic analysis, this was confirmed as a copolymer.

When N-methyl acrylamide was used instead of N-ethyl acrylamide, similar result was obtained.

EXAMPLE 13

A nozzle for blowing propylene was fitted to a 200 ml. three-necked flask equipped with a stirrer. After evacuated and flushed with nitrogen, the flask was cooled to —78° C. with Dry Ice and methanol. Twenty milliliters of toluene, 3 g. of acrylamide and 50 mmol of ethylaluminum dichloride were introduced in this flask under nitrogen atmosphere. Twenty grams of propylene gas was blown into the content of the flask kept at —78° C. over a period of 60 minutes and polymerized. Resulting content was after-treated as in Example 1, whereby 1.53 g. of solid copolymer was obtained. This polymer was insoluble in water.

EXAMPLE 14

A nozzle for blowing propylene was fitted to a 200 ml. three-necked flask equipped with a stirrer, and the interior of the flask was evacuated and flushed with nitrogen. Fifty milliliters of benzene, 6 g. of N-lauryl acrylamide and 12.5 mmol of ethylaluminum sesquichloride was introduced in this flask under nitrogen atmosphere. Fifty grams of propylene gas was blown into the flask maintained and polymerized at room temperature over a period of 60 minutes. By similar after-treatment as in Example 1, 1.38 g. of copolymer was obtained.

EXAMPLE 15

In similar way as in Example 1, 50 mmol of ethylaluminum dichloride was added to the mixture of 30 g. of propylene and 2.5 g. of acrolein at —78° C., and polymerized for 10 minutes, whereby 1.55 g. of copolymer was obtained.

EXAMPLE 16

Fifty milliliters of n-heptane was charged in the same apparatus as in Example 1, and 50 g. of propylene was liquefied at —78° C. in this apparatus. Fifty millimoles of ethylaluminum dichloride was added to the mixture of n-heptane and propylene under nitrogen atmosphere and further 2.5 g. of acrolein was added thereto. After the reaction for 10 minutes, the reaction product was treated with cold ethyl ether and polymer was recovered, whereby 0.355 g. of white solid polymer was obtained. It was considered as a 1:1 alternating copolymer from the results of elementary analysis.

EXAMPLE 17

Similar procedure as in Example 16 was repeated but 3.5 g. of methyl vinyl ketone was used instead of acrolein, whereby a 0.89 g. of polymer was obtained. The result of elementary analysis showed that it contained 74.26% of carbon and 10.63% of hydrogen. This result was in good accordance with the calculated values of 1:1 alternating copolymer, C: 74.95%, H: 10.78%.

EXAMPLE 18

Fifty milliliters of toluene, 12.5 mmol of ethylaluminum sesquichloride and 3 g. of cyclohexyl acrylate were charged in a 300 ml. magnetic stirring type autoclave under the atmosphere of nitrogen and to this mixture was added 30 g. of propylene at 25° C. Three point six eight grams of copolymer was obtained by the polymerization for 4 hours.

EXAMPLE 19

A 300 ml. magnetic stirring type autoclave was evacuated and flushed with nitrogen. Twenty milliliters of n-heptane, and 25 mmol of ethylaluminum sesquichloride were introduced. At —78° C., was charged therein 100 g. of ethylene. Subsequently 4 g. of methyl acrylate was pressed in through a coil from a pressurized bomb. After the polymerization for 3 hours at —78° C., a 0.83 g. of white, elastic solid polymer was obtained. By the viscosity measurement in benzene solution at 30° C., it showed an intrinsic viscosity of 1.53. The analytical values of carbon and hydrogen by an elementary analysis were 63.22% and 9.11% respectively. These values coincide with the calculated values of 1:1 alternating copolymer which are 63.13% and 8.83% respectively. By being pressed with a hot press, this polymer yielded a film having excellent transparency and flexibility. The specific gravity measured by a flotation method was 1.119 at 23° C.

EXAMPLE 20

By similar procedure as in Example 19, 6 g. of n-butyl acrylate was used instead of methyl acrylate and the polymerization was carried out for 3 hours, whereby 3.09 g. of polymer was obtained. This polymer was confirmed by the elementary analysis to be a 1:1 alternating copolymer. The intrinsic viscosity obtained by the measurement in benzene solution at 30° C. was 1.49.

EXAMPLE 21

By use of the same apparatus as in Example 19, 50 ml. of toluene, 25 mmol of ethylaluminum sesquiiodide and 4 g. of ethyl acrylate were mixed under the atmosphere of nitrogen. One hundred grams of butene-1 was pressed in at 25° C. and subjected to polymerization for 3 hours, whereby 4.37 g. of white solid alternating copolymer was obtained.

EXAMPLE 22

A 100 ml. flask was evacuated and flushed with nitrogen and cooled at —78° C. by Dry Ice and methanol. Fifteen grams of isobutylene and 2 g. of methyl acrylate were admixed in this flask under the atmosphere of nitrogen and further 12.5 mmol of ethylaluminum sesquichloride was added. The polymerization was carried out at —78° C. for 10 minutes. The resulting polymer was soluble in ethyl ether and did not contain homopolymer of isobutylene. By the elementary analysis, it was confirmed to be a 1:1 copolymer. By the viscosity measurement in benzene solution at 30° C., the intrinsic viscosity was found to be 4.04. When heated at 107° to 111° C., it softened and provided an excellent film by use of a press. The specific gravity at 23° C. was 1.060.

EXAMPLE 23

Twenty grams of hexene-1 and 2 g. of methyl acrylate were charged under the atmosphere of nitrogen in a 100 ml. flask which had been evacuated and flushed with nitrogen in advance. Twelve and a half millimoles of ethylaluminum sesquichloride dissolved in heptane was added thereto at 40° C. Ten minutes later, methanol was added to terminate polymerization, the content was taken out and insoluble matter was collected by filtration. The resulting solid matter was treated with hydrochloric acid and methanol, and washed sufficiently with methanol, whereby a solid polymer was obtained. One point three five grams of polymer was obtained after vacuum drying at 50° C. This polymer was confirmed to be a copolymer by the infrared spectroscopic analysis.

EXAMPLE 24

Four grams of methyl acrylate, 20 ml. of n-heptane and 25 mmol of ethylaluminum sesquichloride were mixed at −78° C. under the atmosphere of nitrogen in a 200 ml. three-necked flask which had been evacuated and flushed with nitrogen in advance to produce a complex. When the temperature was raised to 0° C. the complex was separated, forming an oily layer. Ten milliliters of hexene-1 was added to the content under agitation and subjected to polymerization reaction for 4 hours, whereby 2.34 g. of elastomeric white solid polymer was obtained. By the elementary analysis, the formation of 1:1 alternating copolymer was recognized.

EXAMPLE 25

In a 200 ml. three-necked flask which had been evacuated and flushed with nitrogen, were mixed under the atmosphere of nitrogen at −78° C., 20 ml. of n-heptane, 2 g. of methyl acrylate, and 12.5 mmol of ethylaluminum sesquichloride. The mixture was heated to 25° C. and 8.4 g. of octadecene-1 was added thereto. Two point two eight grams of white solid polymer was obtained by the polymerization for 5 hours. The result of elementary analysis, 78.90% of carbon and 12.84% of hydrogen indicated good accordance with the calculated value of 1:1 alternating copolymer, C: 78.04% and H: 12.50%.

EXAMPLE 26

In a 200 ml. three-necked flask which had been evacuated and flushed with nitrogen, were mixed under the atmosphere of nitrogen, 20 ml. of n-heptane, 12.5 mmol of ethylaluminum sesquichloride and 2 g. of methyl acrylate. Fifteen grams of alpha-methyl styrene was added to the mixture at 0° C. Three point two eight grams of white solid polymer was obtained by the polymerization for 1.5 hours. The intrinsic viscosity of polymer was 2.39. The values of elementary analysis i.e. C: 75.96% and H: 7.76% showed excellent accordance with the calculated values of 1:1 alternating copolymer i.e. C: 76.40% and H: 7.90%. This polymer softened and liquefied at 190° to 196° C. and afforded an excellent film by hot press. The specific gravity was 1.129 at 23° C.

EXAMPLE 27

In a 200 ml. three-necked flask were mixed under the atmosphere of nitrogen, 30 ml. of toluene, 2 g. of methyl acrylate and 12.5 mmol of ethylaluminum sesquichloride. Twenty five grams of 1-vinylnaphthalene was added to the resulting mixture. By the polymerization at 25° C. for 3 hours, 2.54 g. of white solid polymer was obtained. When the polymerization was carried out with use of p-methylstyrene instead of vinylnaphthalene and phenyl acrylate instead of methyl acrylate, similar solid copolymer was also obtained.

EXAMPLE 28

In a 100 ml. three-necked flask were mixed 20 g. of styrene and 2 g. of methyl acrylate and cooled at −78° C. Twelve and a half millimoles of ethylaluminum sesquichloride was added to the resulting mixture. By the polymerization for 10 minutes, 1.83 g. of white solid polymer was obtained.

EXAMPLE 29

In a 200 ml. three-necked flask were mixed under the atmosphere of nitrogen 20 ml. of n-heptane, 3 g. of methyl acrylate and 12.5 mmol of ethylaluminum sesquichloride. Fifteen grams of styrene was added to the resulting mixture maintained at 0° C. and subjected to polymerization for 10 minutes. The resulting polymer weighed 1.90 g. The intrinsic viscosity of this polymer measured in benzene solution was 5.40. The values of elementary analysis of this polymer were C: 74.35%, H: 8.37%, by which this polymer was confirmed to be a 1:1 alternating copolymer. This polymer was soluble in Cellosolve and liquefied at 186° to 189° C. It was recognized that it softened at a higher temperature than the softening point of polystyrene. Excellent films were obtained by hot press. Its specific gravity was 1.121 at 23° C.

EXAMPLE 30

In a 300 ml. three-necked flask were mixed under the atmosphere of nitrogen, 64 mmol of methyl acrylate, 16 mmol of ethylaluminum sesquichloride in a vehicle of n-butyl chloride. To this mixture was added 96 mmol of styrene and the total volume of liquid was made to 160 ml. By the polymerization at 25° C. for 5 hours, was obtained 8.06 g. of alternating copolymer.

EXAMPLE 31

In a 200 ml. three-necked flask were mixed under the atmosphere of nitrogen 20 ml. of toluene, 12.5 mmol of ethylaluminum sesquichloride and 3 g. of N,N-dimethyl acrylamide. To the resulting mixture was added 15 g. of styrene at 25° C. By the polymerization for 6 hours, 0.32 g. of white solid copolymer was obtained.

EXAMPLE 32

In similar procedure as in Example 31, 5 g. of N-octyl acrylamide was used instead of N,N-dimethyl acrylamide and by the polymerization at 25° C. for 22 hours, 2.13 g. of copolymer was obtained.

EXAMPLE 33

In similar method as in Example 31, 5 g. of N,N-di-n-butyl acrylamide was used instead of N,N-dimethyl acrylamide, and by the polymerization for 4 hours, 0.16 g. of copolymer was obtained.

EXAMPLE 34

In similar way as in Example 31, using 3 g. of sodium acrylate instead of N,N-dimethyl acrylamide, the polymerization was carried out for 4 hours. Sodium acrylate was suspended as fine powder throughout the polymerization. Five point four nine grams of white solid copolymer was obtained.

EXAMPLE 35

In similar procedure as in Example 31, 4.5 g. of N-cyclohexyl acrylamide was used instead of N,N-dimethyl acrylamide and the polymerization was carried out for 5.5 hours, whereby 1.57 g. of white solid copolymer was obtained. The result of nitrogen analysis, N: 5.45%, indicated the good accordance with the calculated value of 1:1 alternating copolymer, N: 5.44%.

What is claimed is:

1. A copolymer having a high molecular weight and consisting essentially of a 1:1 alternating copolymer of monomer (1) and monomer (2), wherein monomer (1) is selected from the group consisting of a terminally unsaturated hydrocarbon having 2 to 20 carbon atoms and represented by the formula:

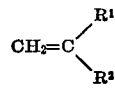

wherein $R^1$ and $R^2$ each is hydrogen or an alkyl, aryl, aralkyl, alkylaryl or cycloalkyl radical, p-(N,N-dimethylamino)-styrene and p-methoxystyrene and wherein monomer (2) is an acrylic compound represented by the formula:

$$CH_2=CH-\underset{\underset{O}{\|}}{C}-Y$$

wherein Y is a hydrocarbon or halohydrocarbon radical having 1 to 20 carbon atoms or a hydrogen atom.

2. A copolymer according to claim 1 wherein said acrylic compound is selected from the group consisting of acrolein and vinyl ketones.

3. A copolymer according to claim 1 wherein the terminally unsaturated hydrocarbon is ethylene, propylene, butene-1, hexene-1, octadecene-1, styrene, p-methylstyrene, vinylnaphthalene, allylbenzene, vinylcyclohexane, isobutylene or alpha-methylstyrene and the acrylic compound is acrolein or a vinyl ketone.

4. A copolymer according to claim 1 wherein the terminally unsaturated hydrocarbon is selected from the group consisting of ethylene, propylene, butene-1, hexene-1, octadecene-1, styrene, p-methylstyrene, vinylnaphthalene, allylbenzene, vinylcyclohexane, isobutylene and alpha-methylstyrene and the acrylic compound is selected from the group consisting of acrolein and methyl vinyl ketone.

5. A copolymer according to claim 1 wherein said acrylic compound is selected from the group consisting of acrolein, methyl vinyl ketone, ethyl vinyl ketone, phenyl vinyl ketone, cyclohexyl vinyl ketone, and vinyl-[4-methyl-naphthyl-(1)]-ketone.

6. A copolymer having a high molecular weight and consisting essentially of a 1:1 alternating copolymer of monomer (1) and monomer (2), wherein monomer (1) is selected from the group consisting of a terminally unsaturated hydrocarbon having 2 to 20 carbon atoms and represented by the formula:

$$CH_2=C\overset{R^1}{\underset{R^2}{\diagdown}}$$

wherein $R^1$ and $R^2$ each is hydrogen or an alkyl, aryl, aralkyl, alkylaryl or cycloalkyl radical, p-N,N-dimethylamino)-styrene and p-methoxystyrene and wherein monomer (2) is an acrylic compound represented by the formula:

$$CH_2=CH-\underset{\underset{O}{\|}}{C}-Y$$

wherein Y is —SR, ZH, ZMe, NR'R" or a halogen atom, in which Z is an oxygen or sulfur atom, R is a hydrocarbon or halohydrocarbon radical having 1 to 20 carbon atoms, R' and R" each is hydrogen or a hydrocarbon radical having 1 to 20 carbon atoms including the case in which R' and R" are mutually united at a position other than the nitrogen atom and Me is a metal of the first group of Mendeleev's Periodic Table or an ammonium radical.

7. A copolymer according to claim 6 wherein said acrylic compound is selected from the group consisting of acrylic acid, thiolacrylic acid, and Group I metal salts, amides and acid halides of said acids.

8. A copolymer according to claim 6 wherein said terminally unsaturated compound is selected from the group consisting of propylene, isobutylene and styrenes and said acrylic compound is selected from the group consisting of acrylic acid, acryloyl chloride and acrylamides.

9. A copolymer according to claim 6 wherein said acrylic compound is acrylic acid.

10. A copolymer according to claim 6 wherein said terminally unsaturated compound is propylene and said acrylic compound is acryloyl chloride.

11. A copolymer according to claim 6 wherein said terminally unsaturated compound is selected from the group consisting of propylene, isobutylene and styrene and said acrylic compound is acrylic acid.

12. A copolymer according to claim 6 wherein said terminally unsaturated compound is selected from the group consisting of propylene, isobutylene, styrene and said acrylic compound is acryloyl chloride.

13. A copolymer according to claim 6 wherein the terminally unsaturated hydrocarbon is ethylene, propylene, butene-1, hexene-1, octadecene-1, styrene, p-methylstyrene, vinylnaphthalene, allylbenzene, vinylcyclohexane, isobutylene or alpha-methylstyrene and the acrylic compound is acrylic acid, a Group I metal salt of acrylic acid, an acryloyl halide, a thioacrylic ester, acrylamide, or an N-substituted acrylamide compound thereof.

14. A copolymer according to claim 6 wherein the terminally unsaturated hydrocarbon is selected from the group consisting of ethylene, propylene, butene-1, hexene-1, octadecene-1, styrene, p-methylstyrene, isobutylene and alpha-methylstyrene and the acrylic compound is selected from the group consisting of acrylic acid, sodium acrylate, acryloyl chloride, methyl thiolacrylate, acrylamide, N-methyl acrylamide, N-ethyl acrylamide, N-n-octyl acrylamide, N-lauryl acrylamide, N-cyclohexyl acrylamide, N,N-dimethyl acrylamide, and N,N-di-n-butyl acrylamide.

15. A copolymer according to claim 6 wherein said terminally unsaturated hydrocarbon is ethylene, propylene, butene-1, isobutene, pentene-1, hexene-1, heptene-1, 3-methylbutene-1, 2-methylpentene-1, 4-methylpentene-1, 4-methylhexene-1, decene-1, dodecene-1, octadecene-1, 4-phenylbutene-1, styrene, alpha-methylstyrene, alpha-butylstyrene, p-dimethylaminostyrene, p-methylstyrene, m-methylstyrene, allylbenzene, isopropenylbenzene, vinylnaphthalene, or vinylcyclohexane and said acrylic compound is methyl thiolacrylate, ethyl thiolacrylate, isopropyl thiolacrylate, phenyl thiolacrylate, methyl dithioacrylate, acrylamide, thioacrylamide, N-methyl acrylamide, N-ethylacrylamide, N-n-butylacrylamide, N-n-hexyl acrylamide, N-n-octyl acrylamide, N-2-ethylhexyl acrylamide, N-n-dodecyl acrylamide, N-stearyl acrylamide, N-cyclohexyl acrylamide, N-tolylacrylamide, N-methyl thioacrylamide, N,N-dimethyl acrylamide, N,N-di-n-butyl acrylamide, N-methyl-N-ethyl acrylamide, acrylyl morpholine, acrylyl pyrrolidine, N,N-dimethyl thioacrylamide, acryloyl chloride, acryloyl bromide, acryloyl iodide, thioacryloyl chloride, acrylic acid, thiolacrylic acid, dithioacrylic acid, sodium acrylate, potassium acrylate, zinc acrylate, or ammonium acrylate.

16. A method for producing a high molecular weight copolymer consisting essentially of 1:1 ratio alternating copolymer of a terminally unsaturated hydrocarbon and an acrylic compound, which comprises contacting at a temperature of from —150° C. to +100° C. a catalyst consisting essentially of an organoaluminum halide represented by the formula:

$$AlR'''_nX_{3-n}$$

wherein R''' is a hydrocarbon radical having 1 to 20 carbon atoms, X is a halogen atom and n is 1, 1.5 or 2, with (1) a terminally unsaturated hydrocarbon having 2 to 20 carbon atoms and represented by the formula:

$$CH_2=C\overset{R^1}{\underset{R^2}{\diagdown}}$$

wherein $R^1$ and $R^2$ each is hydrogen or an alkyl, aryl, aralkyl, alkylaryl or cycloalkyl radical and (2) an acrylic compound represented by the formula:

$$CH_2=CH-\underset{\underset{O}{\|}}{C}-Y$$

wherein Y is a hydrocarbon or halohydrocarbon radical having 1 to 20 carbon atoms or a hydrogen atom.

17. A method according to claim 16 wherein said organoaluminum halide is an alkylaluminum dihalide, an alkylaluminum sesquihalide or a dialkylaluminum halide.

18. A method according to claim 16 wherein the order of contact is so selected as to form a complex of said acrylic compound and said organoaluminum compound first, followed by the addition of said unsaturated hydrocarbon.

19. A method according to claim 16 wherein the order of contact is so selected as to form a complex of said acrylic compound and said unsaturated hydrocarbon at first, followed by the addition of said organoaluminum halide.

20. A method according to claim 16, wherein the order of contact is so selected as to mix said unsaturated hydrocarbon and said organoaluminum compound at first, followed by addition of said acrylic compound.

21. A method according to claim 16, wherein said unsaturated hydrocarbon is used in excess of the amount of said acrylic compound.

22. A method according to claim 16, wherein the contact of said organoaluminum halide with said unsaturated hydrocarbon and said acrylic compound is carried out in the absence of a vehicle.

23. A method according to claim 16, wherein the contact of said organoaluminum halide with said unsaturated hydrocarbon and said acrylic compound is carried out in the presence of a hydrocarbon vehicle or halogenated hydrocarbon vehicle.

24. A method according to claim 16, wherein said organoaluminum halide is ethylaluminum dichloride, ethylaluminum sesquichloride, methylaluminum sesquibromide, and diethylaluminum fluoride.

25. A method according to claim 16, wherein said organoaluminum halide is used in an amount of 0.01 to 10 moles per mole of said acrylic compound.

26. A method according to claim 16, wherein the organoaluminum halide is used in an amount substantially equimolar to the amount of the acrylic compound.

27. A method for producing a high molecular weight copolymer consisting essentially of 1:1 ratio alternating copolymer of a terminally unsaturated hydrocarbon and an acrylic compound, which comprises contacting at a temperature of from $-150°$ C. to $+100°$ C. a catalyst consisting essentially of an organoaluminum halide represented by the formula:

$$AlR'''_nX_{3-n}$$

wherein R''' is a hydrocarbon radical having 1 to 20 carbon atoms, X is a halogen atom and $n$ is 1, 1.5 or 2, with (1) a terminally unsaturated hydrocarbon having 2 to 20 carbon atoms and represented by the formula:

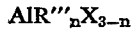

wherein $R^1$ and $R^2$ each is hydrogen or an alkyl, aryl, aralkyl, alkylaryl or cycloalkyl radical and (2) an acrylic compound represented by the formula:

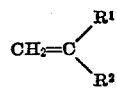

wherein Y is —SR, ZH, ZMe, NR'R'' or a halogen atom, in which Z is an oxygen or sulfur atom, R is a hydrocarbon or halohydrocarbon radical having 1 to 20 carbon atoms, R' and R'' each is hydrogen or a hydrocarbon radical having 1 to 20 carbon atoms including the case in which R' and R'' are mutually united at a position other than the nitrogen atom and Me is a metal of the first group of Mendeleev's Periodic Table or an ammonium radical.

28. A method according to claim 27 wherein said organoaluminum halide is an alkylaluminum dihalide, an alkylaluminum sesquihalide or a dialkylaluminum halide.

29. A method according to claim 27, wherein the order of contact is so selected as to form a complex of said acrylic compound and said organoaluminum compound first, followed by the addition of said unsaturated hydrocarbon.

30. A method according to claim 27, wherein the order of contact is so selected as to form a complex of said acrylic compound and said unsaturated hydrocarbon at first, followed by the addition of said organoaluminum halide.

31. A method according to claim 27, wherein the order of contact is so selected as to mix said unsaturated hydrocarbon and said organoaluminum compound at first, followed by addition of said acrylic compound.

32. A method according to claim 27, wherein said unsaturated hydrocarbon is used in excess of the amount of said acrylic compound.

33. A method according to claim 27, wherein the contact of said organoaluminum halide with said unsaturated hydrocarbon and said acrylic compound is carried out in the absence of a vehicle.

34. A method according to claim 27, wherein the contact of said organoaluminum halide with said unsaturated hydrocarbon and said acrylic compound is carried out in the presence of a hydrocarbon vehicle or halogenated hydrocarbon vehicle.

35. A method according to claim 27, wherein said organoaluminum halide is ethylaluminum dichloride, ethylaluminum sesquichloride, methylaluminum sesquibromide, and diethylaluminum fluoride.

36. A method according to claim 27, wherein said organoaluminum halide is used in an amount of 0.01 to 10 moles per mole of said acrylic compound.

37. A method according to claim 27, wherein the organoaluminum halide is used in an amount substantially equimolar to the amount of the acrylic compound.

38. A copolymer having a high molecular weight and consisting essentially of a 1:1 alternating copolymer of monomer (1) and monomer (2), wherein monomer (1) is a terminally unsaturated hydrocarbon having 2 to 20 carbon atoms and represented by the formula:

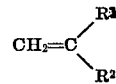

wherein $R^1$ and $R^2$ each is hydrogen or an alkyl, aryl, aralkyl, alkylaryl or cycloalkyl radical and wherein monomer (2) is an acrylic compound represented by the formula:

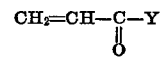

wherein Y is R, SR, ZH, ZMe, NR'R'', halogen or hydrogen in which Z is oxygen or sulfur, R is a hydrocarbon or halohydrocarbon radical having 1 to 20 carbon atoms, R' and R'' each is hydrogen or a hydrocarbon radical having 1 to 20 carbon atoms including a case in which R' and R'' are mutually united at a position other than the nitrogen atom and Me is a metal of the first group of Mendeleev's Periodic Table or an ammonium radical.

39. A method for producing a high molecular weight copolymer consisting essentially of 1:1 ratio alternating copolymer of a terminally unsaturated hydrocarbon and an acrylic compound, which comprises contacting at a temperature of from $-150°$ to $+100°$ C. a catalyst consisting essentially of an organoaluminum halide represented by the formula:

$$AlR'''_nX_{3-n}$$

wherein R''' is a hydrocarbon radical having 1 to 20 carbon atoms, X is a halogen atom and $n$ is 1, 1.5 or 2, with (1) a terminally unsaturated hydrocarbon having 2 to 20 carbon atoms and represented by the formula:

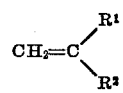

wherein $R^1$ and $R^2$ each is hydrogen or an alkyl, aryl, aralkyl, alkylaryl or cycloalkyl radical and (2) an acrylic compound represented by the formula:

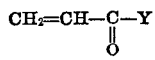

wherein Y is R, SR, ZH, ZMe, NR'R", halogen or hydrogen in which Z is oxygen or sulfur, R is a hydrocarbon or halohydrocarbon radical having 1 to 20 carbon atoms, R' and R" each is hydrogen or a hydrocarbon radical having 1 to 20 carbon atoms including the case in which R' and R" are mutually united at a position other than the nitrogen atom and Me is a metal of the first group of Mendeleev's Periodic Table or an ammonium radical.

40. A copolymer according to claim 1 wherein said monomer (1) is p-(N,N-dimethylamino)styrene.

41. A copolymer according to claim 6 wherein said monomer (1) is p-methoxystyrene.

References Cited
UNITED STATES PATENTS

| | | | |
|---|---|---|---|
| 3,127,380 | 3/1964 | Welch | 260—85.5 |
| 3,159,607 | 12/1964 | D'Alelio | 260—82.1 |
| 3,169,079 | 2/1965 | Ferrington et al. | 117—124 |
| 3,183,217 | 5/1965 | Serniuk | 260—85.5 |
| 3,326,870 | 6/1967 | Nakaguchi et al. | 260—85.5 |
| 3,492,277 | 1/1970 | Clark | 260—81.1 |

WILLIAM H. SHORT, Primary Examiner

L. L. LEE, Assistant Examiner

U.S. Cl. X.R.

260—674 A, 73 R, 79.7, 86.1 E, 88.1 PN, 88.1 PC, 89.7 R